Oct. 16, 1962     G. W. PATCHETT     3,058,222
APERTURE SIGHTING FOR FIREARMS
Filed Oct. 27, 1959
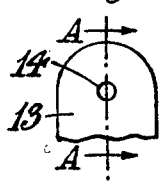
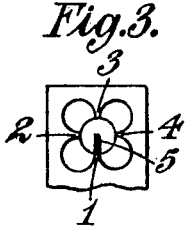
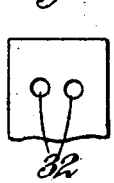
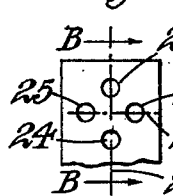
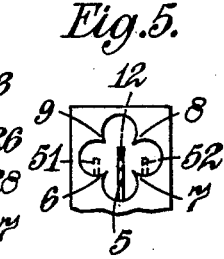
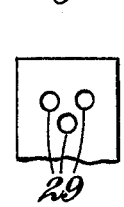
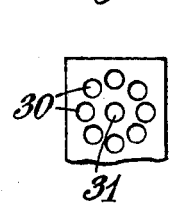
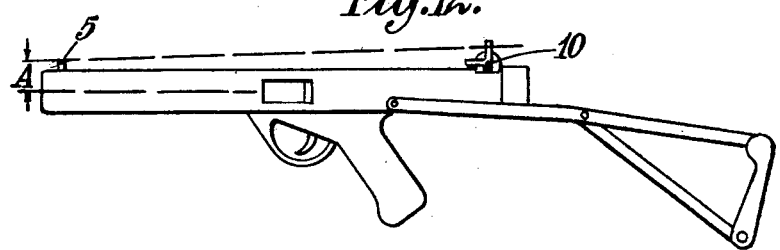
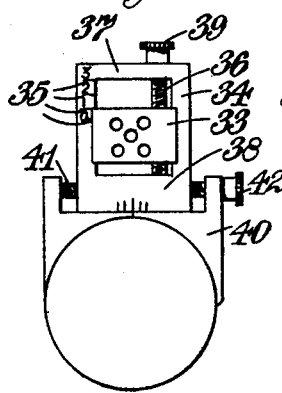
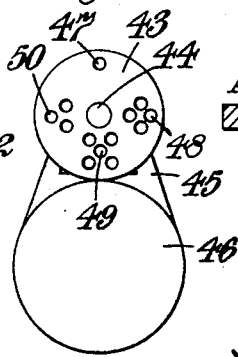
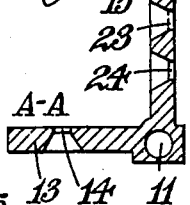
INVENTOR
George William Patchett
By Watson, Cole, Grindle & Watson
ATTORNEYS

United States Patent Office 3,058,222
Patented Oct. 16, 1962

3,058,222
APERTURE SIGHTING FOR FIREARMS
George William Patchett, "The Homestead," 19 Gidea Close, Gidea Park, England
Filed Oct. 27, 1959, Ser. No. 848,977
Claims priority, application Great Britain Nov. 3, 1958
4 Claims. (Cl. 33—47)

This invention relates to aperture sights for fire-arms of the kind in which a member, having a peep-hole in it, is arranged for attachment to the fire-arm so that both the target and a foresight on the fire-arm may be viewed through the hole. The aperture sight is becoming more widely used on various weapons and is nearly universally used on sub-machine carbines with inertia locking of the breech bolt because the lack of recoil with this system enables the aperture sight to be held in close proximity to the firer's eye when shooting from the shoulder. With the known types of aperture sights there are several disadvantages such as, the peep-hole size has to be a compromise so as to be sufficiently small to enable the target to be centralised with accuracy and large enough to allow for use in poor light when the target is hard to see. The accepted size for field use is about 0.08 to 0.10 inch. With peep sights of these dimensions the field of view is restricted. The advantage of the aperture sight is that no attempt is made to focus the eye on the peep sight as is necessary with the open back sight and the foresight becomes the nearest object on which the eye has to be focused thereby improving the definition for all users but especially so for anyone with imperfect vision. These advantages have led to this aperture sight being used more and more.

An object of this invention is to eliminate the disadvantage of the conventional peep-sight and to take advantage of the inability of the eye of focus on a peep-sight held close to it.

According to this invention an aperture rear sight of the kind referred to for a fire-arm comprises an opaque member formed with two or more separate or intersecting apertures or windows so positioned and dimensioned that when the sight is held a predetermined distance from the eye of the firer they merge providing a substantially unobstructed central space through which the foresight and target may be viewed.

The several apertures or windows are preferably so shaped and positioned as to provide alignment in the form of alignment marks optically created by reason of their positioning.

For example the apertures or windows are so shaped and positioned that when the sight is held a predetermined distance from the eye the intervening material between the apertures or windows appears as projections extending inwardly with a central space between their ends through which the foresight and target may be viewed and aligned.

In one arrangement according to the invention two pairs of holes are provided disposed respectively on two lines at right angles to one another. One of said lines may be vertically disposed or the two lines may be at 45° to the vertical.

In yet another arrangement a centrally disposed aperture or window has a number of other apertures or windows disposed around it.

The opaque member may be rectangular in contour as viewed in the sighting direction. For example, it may be in the form of a blade having a mounting for attachment to the fire-arm.

In any of the arrangements referred to above an adjustable mounting may be provided for the sight whereby the distance of the sight from the axis of the barrel of the fire-arm may be varied in accordance with the range at which the fire-arm is to be fired.

In a further arrangement a number of said opaque members are so movably mounted on a part of the fire-arm or a part for attachment thereto that any one of the apertures may be brought into a vertical plane containing the foresight of the fire-arm and which apertures are arranged at different distances from the axis of the line of the fire-arm according to the ranges required. For example, two blades at right angles may be secured to the fire-arm by a pivotal mounting so that one or other of the blades may extend in the direction of the length of the barrel of the fire-arm which blades are provided with apertures at different distances from the pivot axis.

In an alternative arrangement the opaque member comprises a disc mounted to rotate about an axis substantially parallel with the axis of the bore of the firearm and wherein a number of apertures are formed therein at different distances from the axis of rotation according to the required ranges.

In either of the last arrangements one of the apertures may be a conventional single round hole.

In any of the arrangements means may be provided for adjusting the sight laterally.

The following is a description of a number of embodiments of the invention, reference being made to the accompanying drawings in which:

FIGURE 1 is a rear view of one type of aperture sight with the known single peep-hole;

FIGURE 2 is a rear view of one form of the invention with five peep-holes;

FIGURE 3 is a view of how these holes appear to the firer;

FIGURE 4 shows an alternative form of the invention with four holes equally spaced apart;

FIGURE 5 is a view of how these holes appear to the firer;

FIGURES 6, 7, and 8 shows aperture sights with three holes, nine holes and two holes respectively;

FIGURE 9 shows a composite arrangement of a "flip over sight" embodying a section of FIGURE 1 on a line A—A and a section of FIGURE 4 on a line B—B;

FIGURE 10 shows the invention applied to a tangent type sight having vertical and horizontal adjustments;

FIGURE 11 shows the invention applied to a rotatable disc type aperture sight; and FIGURE 12 shows the general positioning of the rear sight and foresight on a sub-machine gun and their alignment in relation to the centre line of the barrel.

FIGURE 1 shows a conventional form of aperture or peep sight comprising a metal plate 13 having a single round hole 14.

FIGURE 2 shows one form of aperture sight according to this invention comprising a rectangular plate 15 in which two pairs of holes 16, 17 and 18, 19 are arranged respectively on two lines 20, 21 at right angles to one another and at 45° to the vertical and a central hole 22. When the sight is disposed close to the eye the holes appear to merge together as shown in FIGURE 3 and provide inward projections 1, 2, 3 and 4 between which the foresight 5 of the fire-arm may be centralised. The disposition of these projections is such that the weapon is naturally held vertically in line and this is assisted by the rectangular form of the plate 15. Most modern weapons have the sighting centres relatively high from the centre line of the barrel as shown at A on FIGURE 12 so that holding the weapon correcting vertical has an important bearing on the accuracy of the shooting.

In the arrangement shown in FIGURE 4 two pairs of holes 23, 24 and 25, 26 are disposed respectively on lines 27, 28 at right angles to one another, the line 27 being vertical. Again in this instance the sight when viewed from close to the eye results in the holes merging with one another leaving pointed and inwardly directed projections 6, 7, 8 and 9 as shown in FIGURE 5. With this arrangement the foresight 5 may be lined up between the points 6 and 7 for a range of say 100 yards and between the points 8 and 9 for a range of say 200 yards as shown by dotted lines at 12. If the target is moving or if a strong side wind is blowing the foresight may be lined up with the part circles 51 or 52 according to the direction of the wind or movement of the target.

In the arrangement shown in FIGURE 6 three holes 29 are provided which result in three inwardly extending projections being optically formed when the sight is placed close to the eye, one extending vertically downwards and the other two inclined upwardly and inwardly.

In the arrangement shown in FIGURE 7 eight holes 30 are spaced around a circle at the centre of which is an additional hole 31. When this sight is placed close to the eye there are optically produced eight inwardly extending radial projections and a vague central ring.

In the arrangement shown in FIGURE 8 two holes are spaced apart side by side which results in the optical production of the upper and lower projections having their adjacent ends spaced apart.

In the arrangement shown in FIGURE 9 a sighting plate 15 such as is shown in FIGURE 4 is formed integrally with a plate 13 such as is shown in FIGURE 1 so that the two plates are disposed at right angles to one another. It will be noted that the various holes are provided with outwardly flared portions which when the sight is in use are directed towards the foresight. At the junction of the two plates 13 and 15 a hole 29 is formed by which the right angle assemblage is attached to the fire-arm by a pivot pin passing through suitable holes in a mounting 10 (see FIGURE 12). Thus either the plate 13 or 15 may be arranged upright.

FIGURE 10 illustrates the invention applied to a conventional "tangent" type sight in which the vertically moving slide 33 is formed with five holes as in FIGURE 2 and is mounted in a slideway 34 provided with range graduations 35. The slide is moved up and down in the slideway by a screw 36 rotatably mounted in cross members 37, 38 of the slideway so as to be restrained against axial movement and is provided with a manipulating knob 39. The screw engages a threaded hole in the slide. The slideway 34 in its turn slides horizontally in a mounting 40 and is provided with a threaded hole which is engaged by a screw 41 rotatable in the mounting and provided with a manipulating knob 42.

FIGURE 11 shows a multi-peep rotatable disc sight comprising a disc 43 rotatably mounted on a pin 44 carried by a mounting 45 attached to the fire-arm 46. The disc is provided with four aperture sights one of which is standard single hole peep sight 47. The three others 48, 49, 50 comprise holes arranged in the manner shown in FIGURES 4, 2 and 6 respectively. It will be noted that the hole 47 and the centre of these three groups are at different distances from the axis of rotation of the disc according to the required ranges.

I claim:
1. An aperture rear sight for a firearm comprising an opaque member arranged for attachment to the firearm near the eye of the firer and formed with two pairs of holes of similar shape and dimension and disposed respectively on two lines at right angles to one another and intersecting the line of sight and symmetrically with respect to the line of sight and simultaneously viewable and providing optically created, sharply defined aligning marks.

2. An aperture rear sight according to claim 1 wherein a central hole is disposed on the intersection of the said two lines.

3. An aperture rear sight according to claim 1, wherein one said pair of holes lie on a vertical line.

4. An aperture rear sight according to claim 1, wherein the lines on which said pairs of holes lie are at 45° to the vertical.

References Cited in the file of this patent

UNITED STATES PATENTS

| | | |
|---|---|---|
| 939,813 | Downey | Nov. 9, 1909 |
| 1,466,913 | Matthews | Sept. 4, 1923 |
| 2,334,300 | Williams | Nov. 16, 1943 |
| 2,741,029 | Councill | Apr. 10, 1956 |
| 2,866,268 | Collins | Dec. 30, 1958 |